United States Patent [19]

Davies et al.

[11]  3,852,080

[45]  Dec. 3, 1974

[54] METHOD FOR MAKING MAGNESITE BRICK

[75] Inventors: Ben Davies; George F. Carini; Ernest P. Weaver, all of Pittsburgh, Pa.

[73] Assignee: Dress Industries, Inc., Dallas, Tex.

[22] Filed: May 16, 1973

[21] Appl. No.: 360,885

Related U.S. Application Data

[63] Continuation-in-part of Ser. No. 48,937, June 19, 1970, , which is a continuation of Ser. No. 858,524, Sept. 16, 1969, , which is a continuation-in-part of Ser. No. 661,193, Aug. 17, 1967, abandoned.

[52] U.S. Cl.......................... 106/58, 106/56, 106/68
[51] Int. Cl............................................. C04b 35/04
[58] Field of Search........................ 106/56, 58, 63

[56] References Cited

UNITED STATES PATENTS

| | | | |
|---|---|---|---|
| 2,206,131 | 7/1940 | Seil | 106/58 |
| 2,292,644 | 8/1942 | Lee | 106/58 |
| 2,621,131 | 12/1952 | Lathe | 106/58 |
| 3,378,383 | 4/1968 | Van Dreser | 106/63 |

*Primary Examiner*—J. Poer

[57] ABSTRACT

Method of making magnesite brick comprising preparing a batch of synthetic magnesite having an MgO content of from 90 to 96 per cent, a lime: silica ratio in excess of 2:1, and at least 0.1 per cent finely divided silica to provide the batch with a lime: silica ratio between 2:1 and 1.4:1, and burning in excess of 2,800°F.

7 Claims, No Drawings

METHOD FOR MAKING MAGNESITE BRICK

CROSS REFERENCES TO RELATED APPLICATIONS

This is a continuation-in-part of U.S. application Ser. No. 48,937, filed June 19, 1970, which is a continuation of U.S. application Ser. No. 858,524, filed Sept. 16, 1969 which was a continuation-in-part of U.S. application Ser. No. 661,193, filed Aug. 17, 1967, all now abandoned.

BACKGROUND OF THE INVENTION

The trend in the new basic oxygen steelmaking has been toward larger and larger steel-making vessels. The trend has put great demands on refractories for lining the vessels. Many large vessels (that is, those exceeding 150 tons capacity) are partially lined with burned, tar-impregnated, magnesite brick which is, itself, a recent development. This invention relates to an improved method of manufacturing magnesite and tar-impregnated magnesite brick.

Magnesite brick are refractory brick manufactured substantially or entirely of dead-burned magnesite. Dead-burned magnesite is the granular product obtained by burning or firing magnesite ($MgCO_3$) or other substances convertible to magnesia ($MgO$), upon heating, above about 3,500°F. long enough to form dense, hydration-resistant granules. For convenience, those practiced in the art frequently refer to dead-burned magnesite merely as magnesite.

Synthetic magnesites are products obtained by beneficiating or otherwise chemically treating naturally occurring mineral ores such as magnesite, breunnerite, brucite and the like, or by precipitating the magnesian values from sea waters and brines and bitterns.

Brick made from very pure synthetic magnesites with lime:silica mole ratios slightly above or below 2:1 and boron oxide contents less than 0.05 per cent have very excellent refractoriness but, unfortunately, are somewhat difficult to manufacture. At normal burning temperatures, no accessory minerals melt, so that only solid-state sintering occurs—which is very slow as compared to sintering in the presence of a liquid phase. A method of making magnesite brick has now been discovered, whereby they can be made from such high-purity synthetic magnesites with a small addition of silica which greatly increases the rate of sintering without destroying the ultimate refractoriness of the brick. Basically, this invention is based on the creation of chemical nonequilibrium in the fine fraction of the refractories batch to accelerate solid-state sintering.

Other workers have suggested the use of two component batches. For example, Lathe, in U.S. Pat. No. 2,621,131, attempts to form large amounts of liquids which will be present over an extended period of time during the firing process by combining refractory and nonrefractory components in a batch. To accomplish this, Lathe keeps the nonrefractory liquid-forming component and the refractory component in different size fractions of the batch so that they will not react immediately to form refractory compounds. Unfortunately, liquids present during burning are very detrimental to commercial production of refractories. They cause warping and sagging of the brick during the burning process. Furthermore, large additions to provide liquid formation according to the Lathe conception are inconsistent with current requirements of high purity.

Lee, in U.S. Pat. No. 2,292,644, suggests the addition of calcareous materials to a magnesite brick batch comprising a magnesite containing merwinite to raise the lime:silica ratio and, hence, provide a more refractory matrix phase. This permits dead burning the magnesite grain at lower temperatures. This procedure is undesirable as the coarse fractions contain a low-melting phase which is not easily reacted with the calcareous addition.

Van Dresser, in U.S. Pat. No. 3,378,383, discloses a product containing not over 0.75 per cent silica, not over 1.5 per cent lime, at least 98.5 per cent magnesia and a lime to silica ratio of at least 1 to 1. The reference indicates that lesser MgO contents provide inferior products which is contrary to the findings according to the present invention.

BRIEF DESCRIPTION OF THE INVENTION

According to this invention, magnesite brick are made by first forming a batch of size graded, synthetic, dead-burned magnesite having from about 90 to about 96 per cent by weight MgO based on the total batch, a lime: silica ratio in excess of 2:1, and finely divided silica in an amount of at least 0.1 per cent, by weight, of the total batch. The finely divided silica and the magnesite are balanced such that chemical analysis shows the lime:silica weight ratio in the total batch to be between about 2:1 and 1.4:1. Preferably, the $CaO:SiO_2$ weight ratio should be between 1.5:1 and 1.8:1. Preferably, the batch should analyze less than 3 per cent of $R_2O_3$ oxide ($Al_2O_3$, $Fe_2O_3$, $Cr_2O_3$), less than 0.5 per cent $TiO_2$, and less than 0.05 per cent $B_2O_3$. The $B_2O_3$ should preferably be less than 0.02 per cent. The batch is thereafter tempered with a suitable binder such as lignosulfonate liquor. The tempered batch is pressed into brick at pressures exceeding about 8,000 psi. The brick are thereafter dried at about 250°F. for about 10 hours. The dried brick are burned at about 2,800°F., or higher.

DETAILED DESCRIPTION OF THE INVENTION

Further features and other objects and advantages of this invention will become clearer to those skilled in the art by careful study of the following detailed description. In the detailed description, all percentages and ratios and parts are by weight; chemical analyses were obtained by spectrographic analyses with control by wet chemical analysis; and are reported as oxides in accordance with the present practice of the refractories industry. Oxide ratios hereafter are based on percentages, by weight, determined by chemical analysis.

The invention will be described further in relationship to the following examples, in which the details are given by way of illustration and not by way of limitation.

Dead-burned magnesite, made synthetically from brine, was used in the following examples, It analyzed approximately 1 per cent silica, 2.45 per cent lime, and less than 0.75 per cent $R_2O_3$ oxides. This magnesite was crushed and sized to a screen analysis in weight per cent as follows:

| | | | |
|---|---|---|---|
| −4 | +10 mesh | — | 30% |
| −10 | +28 mesh | — | 35% |
| ball milled fines | | | |
| | −65 mesh | — | 35% |

The size-graded magnesite was used to prepare brick-making batches. The brick of Example I were made from a batch consisting of 100 per cent of the dead-burned magnesite. Silica additions of 0.2, 0.4, and 0.6 per cent, by weight, were made to the batches of Examples II, III and IV, respectively, The silica additions were finely divided; that is, less than 65 mesh. About 5 per cent of a temporary binder comprising lignosulfonate liquor was added to the batches in a muller-type mixer. Thereafter, the batch was pressed into brick at about 8,000 psi., dried, and fired at about 2,800°F. with a 10-hour hold at maximum temperature.

Brick from each of the foregoing examples were tested for their physical properties using standard test methods. The physical properties and chemical analyses of brick made according to Example I are given in the following table.

When brick according to this invention are to be used in the working lining of basic oxygen vessels, they are tarimpregnated. Impregnation is accomplished either by vacuum-impregnation for one-half hour or, simply, by immersing the burned brick for about 6 hours in liquified pitch, generally heated to about 400°F. Commercially available tar pitch, of petroleum or coke base, can be used for this purpose. Generally, a coal-base pitch having a softening point above about 150°F. is used.

Reasonable variations and modifications are possible within the scope of this disclosure without departing from the spirit and scope of this invention.

We claim:

1. The method of making burned magnesite brick comprising the steps of:
    A. forming a size-graded batch consisting essentially of synthetic dead-burned magnesite having a lime:-

TABLE I

| Example: | | I | II | III | IV |
|---|---|---|---|---|---|
| Bulk Density, pcf:[1] | | 183 | 182 | 183 | 184 |
| Modulus of Rupture, psi. | | | | | |
| At room temperature[2]: | | 2630 | 2140 | 2720 | 2920 |
| At 2300°F.[3]: | | 1520 | 1240 | 2060 | 2050 |
| At 2700°F.[3]: | | 430 | 1260 | 1700 | 1140 |
| Chemical Analysis: | | | | | |
| Silica | ($SiO_2$) | 1.05% | 1.22% | 1.45% | 1.67% |
| Alumina | ($Al_2O_3$) | 0.35 | 0.33 | 0.32 | 0.34 |
| Iron Oxide | ($Fe_2O_3$) | 0.40 | 0.44 | 0.38 | 0.43 |
| Lime | ($CaO$) | 2.45 | 2.40 | 2.38 | 2.47 |
| Magnesia | ($MgO$) | 95.75 | 95.61 | 95.47 | 95.09 |
| Boron Oxide | ($B_2O_3$) | 0.01 | 0.01 | 0.01 | 0.01 |
| $CaO:SiO_2$ ratio | | 2.33:1 | 1.97:1 | 1.64:1 | 1.48:1 |

[1] ASTM Test C134-41, ASTM Standards Part 13 Refractories, Glass and Other Ceramic Materials; Carbon and Graphite Products (1967) p. 76.
[2] ASTM Test C133-55, ibid, p. 72.
[3] ASTM Test C588-65T, ibid, p. 600.

The brick of Examples II, III, and IV are according to the teachings of this invention. They have better hot strength as tested by modulus of rupture (due to better sintering during manufacture) than Example I, not according to this invention. Example III is the best mode now known for practicing this invention.

As is apparent from Table I, the advantages of this invention may be obtained with up to 95.61 per cent MgO (i.e., up to about 96 per cent) although the invention may be practiced with as much as 98 per cent MgO.

It is presently believed that by maintaining the Mgo content in the 90 to about 96 or 98 per cent range, by making up substantially the remainder with lime and silica in a weight ratio between 2:1 and 1.4:1, and by maintaining the $B_2O_3$ below 0.05 weight per cent, the excellent modulus of rupture values at elevated temperatures set forth in Table I, Examples II–IV, are achieved. Magnesia values in excess of 98 per cent yield brick which have decreased high temperature strength. This result is attributed to the development of inadequate dicalcium silicate or solid solution of dicalcium silicate and merwinite constituting the ceramic bond. The high temperature strength of brick containing less than 90 per cent magnesia is adversely affected by the formation, on burning and subsequent cooling, of minute cracks or discontinuities in the matrix. This result is attributed to the inadequate stabilization of the dicalcium silicate. The failure to fully stabilize the dicalcium silicate ceramic bond in the high temperature alpha ($\alpha$) or alpha prime ($\alpha'$) forms results in inversion to the beta ($\beta$) or gamma ($\gamma$) forms on cooling which is attended by disruptive volume changes.

silica weight ratio in excess of 2:1 and at least 0.1 per cent, by weight, of the total batch finely divided silica, the MgO content of the overall batch being from 90 to about 96 per cent, the lime:silica weight ratio of the overall batch being between 2:1 and 1.4:1, the batch analyzing less than 3.0 per cent $R_2O_3$ oxides, less than 0.5 per cent $TiO_2$, less than 0.5 per cent $Al_2O_3$ and less than 0.05 per cent $B_2O_3$;
    B. tempering the batch with a temporary binder;
    C. pressing the tempered batch into brick;
    D. drying the brick; and
    E. firing at temperatures in excess of 2,800°F.

2. Burned magnesite brick formed from a batch consisting essentially of synthetic dead-burned magnesite having a lime: silica weight ratio in excess of 2:1 and at least 0.1 per cent, by weight, of finely divided silica, the MgO content of the overall batch being between 90 and about 96 per cent, the lime:silica weight ratio of the overall batch being between 2:1 and 1.4:1, the batch analyzing less than 3.0 per cent $R_2O_3$ oxides, less than 0.5 per cent $TiO_2$, less than 0.5 per cent $Al_2O_3$, and less than 0.05 per cent $B_2O_3$.

3. The brick according to claim 2 in which the fired brick are tar-impregnated.

4. The brick of claim 2 in which the fired brick have a matrix phase comprising a solid solution of dicalcium silicate and merwinite.

5. The brick of claim 2 in which the batch has a CaO: $SiO_2$ ratio between 1.8:1 and 1.6:1.

6. The brick of claim 2 in which the MgO content is from 90 to 95.61 per cent.

7. The brick of claim 2 in which the MgO content is from about 95 to 96 per cent.

* * * * *